US006581364B2

(12) United States Patent
Lucand et al.

(10) Patent No.: US 6,581,364 B2
(45) Date of Patent: Jun. 24, 2003

(54) LARGE ROUND BALER HAVING BALING CHAMBER CONSTRUCTED SO AS TO FACILITATE THE FLOW OF HARVEST INTO THE CHAMBER

(75) Inventors: Philippe Lucand, Melin (FR); Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/000,061

(22) Filed: Dec. 3, 2001

(65) Prior Publication Data

US 2002/0073677 A1 Jun. 20, 2002

(30) Foreign Application Priority Data

Dec. 18, 2000 (DE) .......................................... 100 63 121

(51) Int. Cl.[7] .............................................. A01D 39/00
(52) U.S. Cl. .......................................... 56/341; 100/88
(58) Field of Search ....................... 56/341, 343; 100/88, 100/89

(56) References Cited

U.S. PATENT DOCUMENTS 3,914,926 A * 10/1975 Braunberger et al. ......... 56/341
4,499,714 A    2/1985 Hollmann ..................... 56/341
5,444,969 A * 8/1995 Wagstaff et al. ............... 56/341
5,598,690 A * 2/1997 McClure et al. ............... 56/341
5,848,523 A * 12/1998 Engel et al. .................... 56/341
5,931,089 A * 8/1999 Viesselmann et al. ........ 100/88
5,979,153 A * 11/1999 Roth ............................. 56/341
6,094,900 A * 8/2000 Underhill et al. ............. 56/341
6,332,309 B1 * 12/2001 Rodewald ..................... 56/341

FOREIGN PATENT DOCUMENTS

| DE | 37 19 857  | 12/1988 |
| DE | 198 10 074 | 9/1998  |
| DE | 198 51 470 | 5/2000  |
| EP | 0 339 730  | 11/1989 |
| EP | 0 970 598  | 1/2000  |
| FR | 2 663 191  | 12/1991 |

* cited by examiner

Primary Examiner—Robert E. Pezzuto
Assistant Examiner—Nathan S Mammen

(57) ABSTRACT

The expansible baling chamber of a large round baler is constructed so as to have chamber-forming elements that act to bias a forming bale away from the chamber inlet so that harvest entering the inlet will be more easily wrapped onto the bale, these chamber-forming elements, in some embodiments, also acting to increase the tension of tensioning mechanism forming part of the baling chamber. Also aiding in the delivery of harvest to the baling chamber is a conveyor having portions located within the chamber inlet.

10 Claims, 4 Drawing Sheets

US 6,581,364 B2

LARGE ROUND BALER HAVING BALING CHAMBER CONSTRUCTED SO AS TO FACILITATE THE FLOW OF HARVEST INTO THE CHAMBER

FIELD OF THE INVENTION

The invention pertains to a round baler having an expansible baling chamber, and more specifically relates to the arrangement of various components forming the baling chamber.

BACKGROUND OF THE INVENTION

DE-A1-198 10 074 discloses a round baler having a baling chamber, the size of which can be varied due to the fact that belts are compliantly supported on rollers, with the belts forming a loop between two rollers situated on the sides of an inlet, and with the baling chamber being formed in said loop. A two-armed carrier that can be pivoted about the rotational axis of a lower roller is provided above the inlet. As the bale diameter increases, a central roller is pressed away from the baling chamber such that a third, upper roller tensions the belts to a certain degree and thus increases the density of the round bale.

A comparable arrangement for tightening belts of this type is disclosed in DE-A1-198 51 470. However, only one roller is arranged on a pivoted carrier in this case, with the pivoting movement of the carrier being controlled by the tensioning arm of the belts.

According to EP-A1-0 339 730, a baling chamber is surrounded by belts and rollers, with four rollers being arranged on a pivoted carrier and partially encompassing the baling chamber. The belts extend through a gap between a roller situated farthest from the pivoting axis of the carrier and a roller situated adjacent thereto. Due to these measures, the walls surrounding the baling chamber are coupled to one another and a high tension is exerted upon the round bale.

The problem to be solved with the invention can be seen in the fact that the supply of new material is difficult to introduce into the baling chamber when the forming bale has a high density.

SUMMARY OF THE INVENTION

According to the present invention there is provided an improved structure for defining an expansible baling chamber of a large round baler.

An object of the invention is to provide a large round baler having an expansible baling chamber that is constructed so as to facilitate the feeding of harvest into the baling chamber.

A more specific object of the invention is to provide a large round baler having an expansible baling chamber having a forward part partially defined by a plurality of rolls mounted to a carrier pivotally mounted to the opposite side walls of the baling chamber, with one or more of the rolls having a flexible tension means, that forms part of the baling chamber, engaged therewith such as to cause the carrier to pivot to press the other roll(s) against the forming bale so to force it away from the bale chamber inlet so as to create a space for allowing the ingress of the harvest.

A further object of the invention is to provide a large round baler as defined in the immediately preceding object, wherein the carrier is so shaped and the roll(s) engaged by the tension means are so located that the carrier causes an increase in the tension of the tension means as the bale increases in size.

Yet another object of the invention is to provide a large round baler as defined in the immediately preceding object, and further including a harvest conveyor which is located partially within the baling chamber inlet for positively delivering the harvest through the inlet.

These and other objects will become apparent from a reading of the ensuing description together with the appended drawings.

DESCRIPTION OF THE PREFERRED EMBODIMENT

Figure 1:
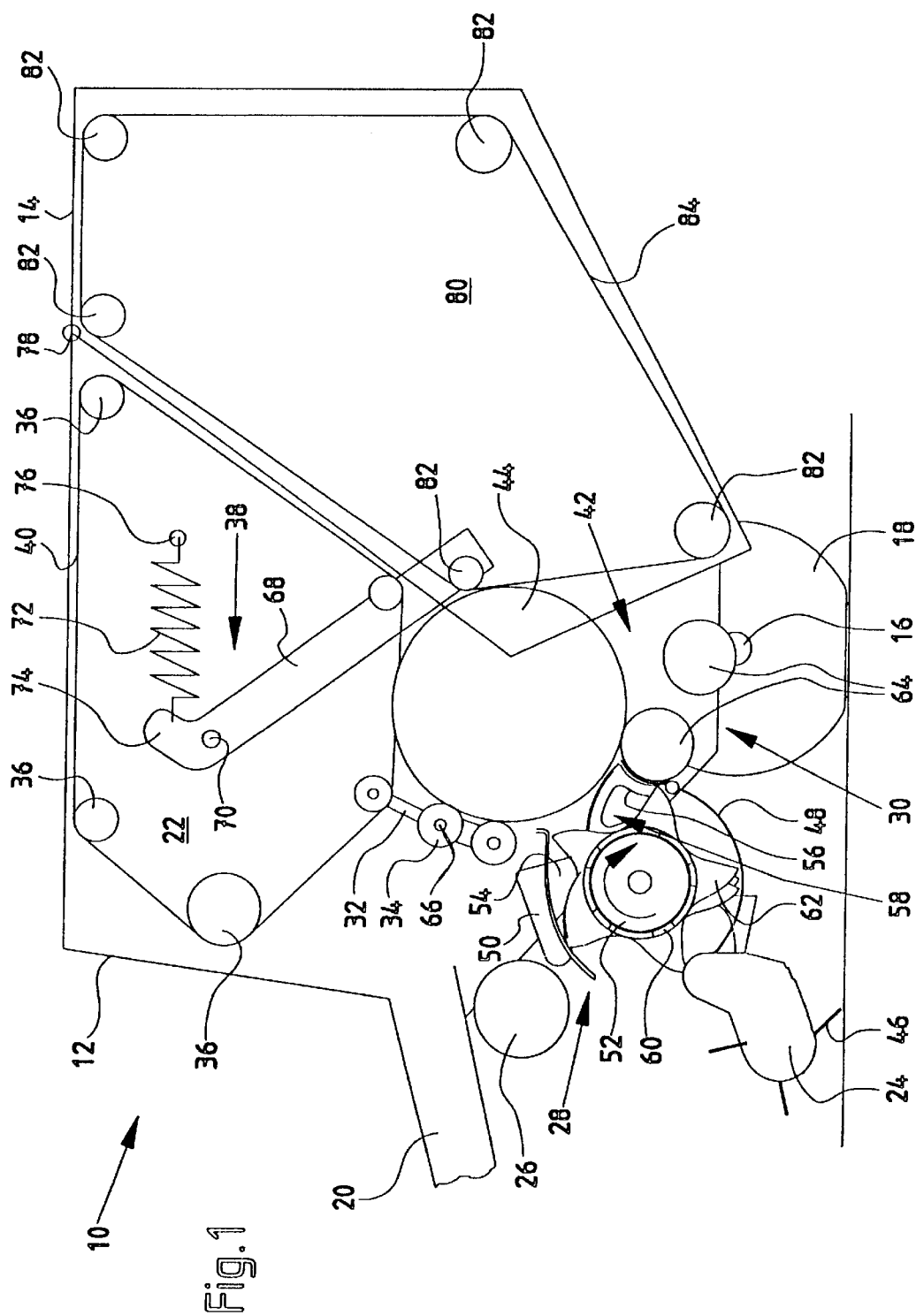
FIG. 1 is a schematic, left side view of a large round baler having a baling chamber, formed in accordance with a first embodiment of the invention, and shown in a condition at the beginning of the baling process.

Referring now to FIG. 1, there is shown a large round baler 10 having a front frame 12 and a rear discharge gate 14. The baler 10 conventionally serves for receiving a mowed harvest and compressing this harvest into round bales of variable size.

The frame 12 includes an axle 16 on which is mounted wheels 18, a hitch 20 and side walls 22, with the frame carrying a pick-up 24, a conveyor 26, a cutting mechanism 28, a bottom conveyor 30 and a carrier 32 with rollers 34, deflection rollers 36, a tensioning device 38 and tension means 40. The frame 12 is supported on the ground by means of the axle 16 and the wheels 18 such that the round baler 10 can be towed over a field by a not-shown towing vehicle.

The hitch 20 is unyieldingly, compliantly or movably connected to the frame 12 and serves for connecting the round baler 10 to the towing vehicle. The side walls 22 are rigidly mounted on the frame 12 and laterally limit a baling chamber 42 for a round bale 44.

The pick-up 24 is conventionally constructed and has the same width or a greater width than the baling chamber 42. The pick-up 24 collects the harvest that lies on the ground with prongs 46 that convey in an overshot fashion and moves the harvest to a cutting mechanism 28 along a transport surface that is not illustrated, with the harvest being fed into the baling chamber 42 from the cutting mechanism.

The conveyor 26 operates in an undershot fashion and is constructed in the form of a rotor that assists in feeding the harvest delivered by the pick-up 24 into the cutting mechanism 28. The conveyor 26 may have a smooth surface or be equipped with drivers, prongs teeth, ribs, screws or the like.

The cutting mechanism 28 customarily contains a bottom 48, a cover 50, a rotor 52, knives 54 and strippers 56. The cutting mechanism 28 is not important for the invention and is only cited as a supplement for this embodiment; it is in particular, possible to omit the knives 54 such that the rotor 52 simply acts as a conveyor. If the cutting mechanism 28 is provided, it serves for comminuting the harvest delivered by the pick-up 24 such that it can be better compacted in the baling chamber 42.

The bottom 48 extends between the pick-up 24 and the bottom conveyor 30 and has a curvature that essentially follows the radius of the rotor 52.

The cover 50 has the same curvature and extends between the conveyor 26 and the carrier 32 or a roller 34 arranged on the lower end region of the carrier, respectively. The bottom 48 and the cover 50 form a receptacle opening upstream of the rotor 52 and an inlet 58 of the baling chamber 42 downstream of the rotor, with the inlet simultaneously being limited by the lower roller 34 and the bottom conveyor 30. When viewing the round baler 10 from the left, the inlet 58 is situated in the first quadrant of the rotor 52 and is consequently arranged essentially laterally thereto.

The rotor 52 includes a central tube 60 and drivers 62 that are attached to the central tube 60 such that they are curved in a trailing fashion. The central tube 60 is driven in the clockwise direction by means of a not-shown drive when viewing the round baler 10 from the left side. The drivers 62 essentially have a triangular shape, the tip of which extends almost to the bottom 48 and the cover 50. A total of five rows of drivers 62 are welded or screwed onto the central tube 60 along helical lines, with the drivers 62 being spaced apart from one another in the axial direction of the rotor 52. The rotor 52 has a significant diameter of approximately 0.6 m.

The knives 54 are constructed conventionally and can preferably be locked in different positions, with the knives also being able to yield in case of an overload. The knives 54 extend into all or only a few of the intermediate spaces between the drivers 62 through slots in the cover 50 that are not visible in the figures. The knives 54 are held by a commonly adjustable carrier that is not illustrated in the figures and may extend up to the central tube 60 in one end position and up to the inner side of the cover 50 in the other end position. As mentioned previously, the knives 54 can also be omitted such that the rotor 52 does not perform a cutting function, but rather only acts as a conveying rotor 52. The knives 54 are situated above the rotor 52 and upstream of the inlet 58.

The strippers 56 are situated upstream of the knives 54 and also arranged in the intermediate spaces between the drivers 62. An upper edge of the drivers 62 extends in a slightly descending fashion toward the cover plate 14 and is slightly bent. The strippers 56 border the central tube 60 on one side and the bottom conveyor 30 on the other side, with the strippers very closely following their contour. The position of the strippers 56 is chosen such that the round bale 44 is able to partially support itself on the strippers in the initial phase of the baling process, with the strippers consequently covering a certain part of the inlet 58.

In this embodiment, the bottom conveyor 30 is formed by two rollers 64 that are mounted stationary in a rotatable fashion in the frame 12 or its side walls 22, respectively, and have a relatively large diameter. The rear roller 64 is arranged lower than the front roller 64 and situated directly above the axle 16. A descending transport surface is thus created on the two rollers 64. Instead of using two rollers 64, it would also be conceivable to provide a larger or smaller quantity of rollers, a chain conveyor, a conveyor belt or the like. The bottom conveyor 30 limits the baling chamber 42 in its lower region with part of its circumference. The rollers 64 are preferably driven.

The carrier 32 is constructed in the form of a rail that is resistant to bending and provided twice, namely on each side wall 22. In this case, sufficiently known reinforcing elements that are not illustrated in the figures are provided between the two carriers. The carrier 32 can be pivoted vertically about a horizontal pivoting axis 66 that extends transverse to the driving direction of the round baler 10. The pivoting axis 66 is situated between the ends of the carrier 32, namely approximately in its center in this particular embodiment, such that it is able to move similar to a rocker.

Assuming three rollers 34 are provided, which is not absolutely imperative, the rollers 34 consist of a lower roller, a central roller and an upper roller 34. The rollers 34 are rotatably accommodated between the two carriers 32 and extend over the entire width of the baling chamber 42. The arrangement is chosen such that, once the round bale 44 essentially has reached its full size, the surfaces or edges facing the round bale 44 lie on a curved surface that follows the diameter of the round bale 44. The diameters of the lower roller and the central roller 34 are greater than the diameter of the upper roller 34. The lower roller 34 is always situated near the rear edge of the cover 50. The rotational axis of the central roller 34 simultaneously forms the pivoting axis 66. However this is not absolutely imperative and may be achieved differently in other embodiments. The pivoting axis 66 may, in particular, be offset toward the bottom, toward the top, toward the front or toward the rear. A gap through which the tension means 40 extends is formed between the central roller and the upper roller 34. The lower roller and the central roller 34 directly form part of the wall of the baling chamber 42, with the harvest being baled therein directly acting upon said rollers.

Several deflection rollers 36, of which at least one is driven, extend between the side walls 22, with said deflection rollers partially being rotatably supported in said side walls parallel to the rollers 34. According to FIG. 1, four deflection rollers 36 are arranged essentially in the corner points of a trapezoid, about which the tension means 40 revolves in an endless fashion. Three of the four deflection rollers 36 are stationarily supported on the intermediate walls 22, with one deflection roller being movably supported on the tensioning device 38.

The tensioning device 38 conventionally includes an arm 68, a bearing 70 and an energy storing device 72. The arm 68 is formed by a massive steel rail and provided twice analogous to the carriers 32, i.e., in the region of both side walls 22. The arm 68 extends almost over the entire length of the side wall 22 and is provided with two deflection rollers 36 in the end region that is situated distant from the bearing 70. These two deflection rollers are spaced apart from one another in the radial direction. One of the deflection rollers 36 is situated in an interior space that is surrounded by the tension means 40. The arm 68 extends beyond the bearing 70 in the end region that is situated proximal to the bearing 70 and slightly angled so as to form a lever arm 74. The bearing 70 accommodates the arm 68 in a vertically pivoted fashion with the end region situated opposite to the deflection rollers 36. For this purpose, a separate bearing 70 may be respectively provided on each end wall 22 or one bearing may extend between the side walls 22.

The energy storing device 72 is constructed in the form of a helical tension spring in this embodiment; alternatively, it would be possible to utilize a hydraulic cylinder with a gas pressure accumulator or a throttle, a different type of spring, a combination thereof or the like. The energy storing device 72 is mounted on the lever arm 74 with one end and on the holder 76 with the other end, with the holder stationarily engaging on the frame 12 or the side wall 22. The energy storing device 72 normally is at least slightly pre-stressed. However, it would also be possible to construct an embodiment in which the resistance of the energy storing device 72 can be varied, e.g., by means of a controllable throttle, such that a different compaction is realized over the diameter of the round bale 44 and a soft core is achieved. The effective direction of the storing device 72 is chosen such that the arm 68 with its deflection rollers 36 is always pressed toward the inlet 58, i.e., in the sense of the smallest baling chamber 42 possible.

The tension means 40 is conventionally formed of several narrow belts that extend parallel to one another in this embodiment. The tension means 40 that is assigned to the frame 12 represents a closed tension means and is provided separately of a tension means provided in the discharge gate 14; however, this is not absolutely imperative. It would also be conceivable to utilize only one tension means 40 in the frame 12 and the discharge gate 14. Beginning at the deflection roller 36 situated on the arm 68, the tension means 40 extends in a clockwise direction through the gap between the upper and central roller 34 arranged on the carrier 32, over a lower front deflection roller, an upper front deflection roller and an upper rear deflection roller 36 in the frame 12. Due to the ability to pivot the arm 68 and the carrier 32, the section of the tension means 40 which extends between the gap and the movable deflection roller 36 can be subjected to an excursion and varied with respect to its size. This section represents part of the wall of the baling chamber 42 and is directly acted upon by the harvest situated in the baling chamber 42.

The baling chamber 42 has a variable size and is bordered by its inlet 58, the rollers 34 arranged on the carrier 32, the part of the tension means 40 which extends between the gap and the movable deflection rollers 36, a tension means section in the discharge gate 14, and the bottom conveyor 30. On the end faces, the baling chamber 42 is essentially closed by the side walls 22.

Figure 2:
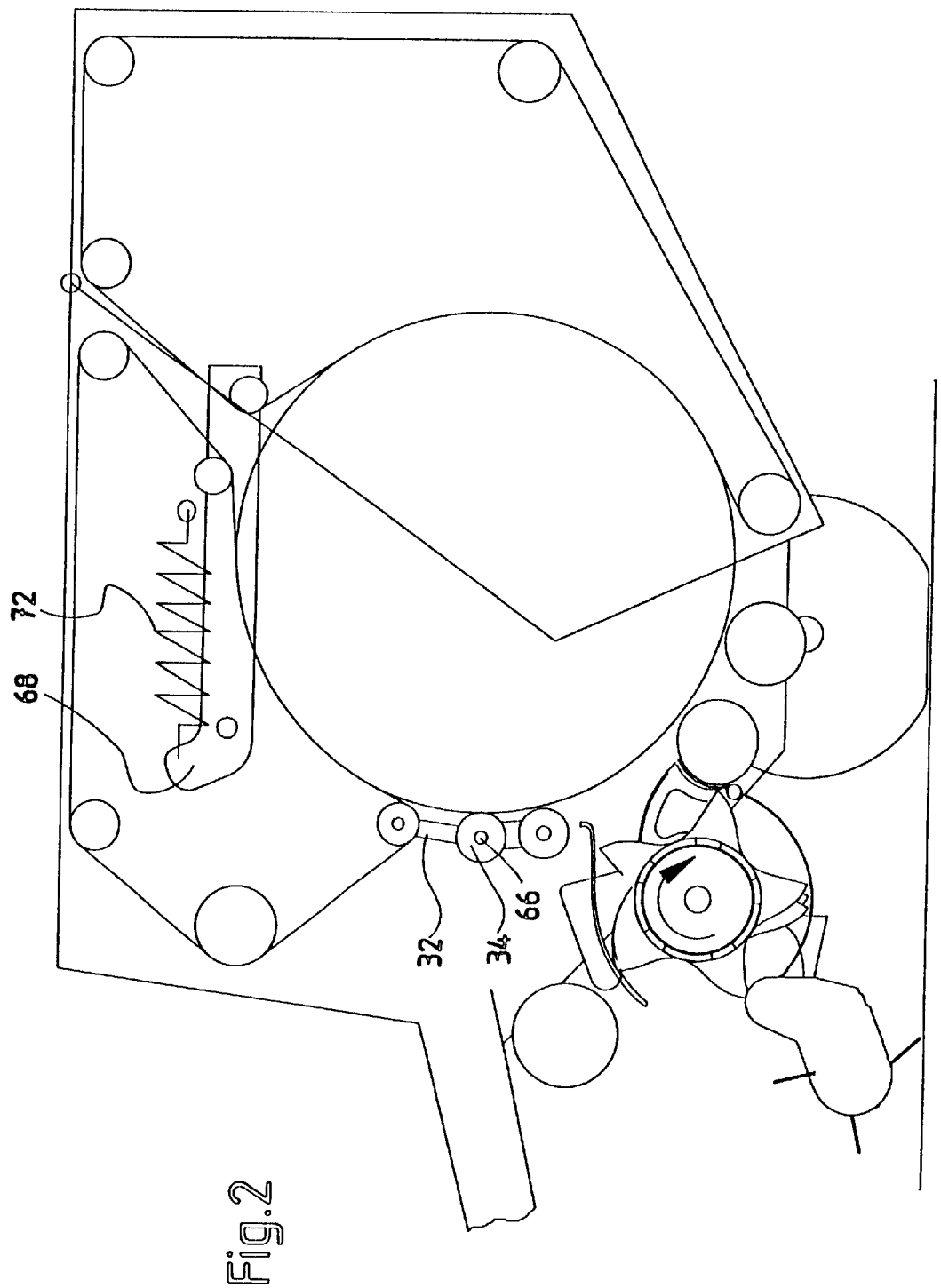
FIG. 2 is a view like that of FIG. 1, but showing the baling chamber in a condition at the end of the baling process.

The round bale 44 is formed of the harvest that is wound up in a helical fashion and ultimately reaches the size indicated in FIG. 2. In order to unload the round bale 44 from the baling chamber 42, the discharge gate 14 is raised such that the round bale 44 is able to roll along the bottom conveyor and then onto the ground. The density of the round bale 44 is attained with the tension of the tension means 40 which is generated by the energy of the energy storage device 72.

The discharge gate 14 is connected to the frame 12 in a vertically pivoted fashion by means of a bearing 78 with the pivoting movement being caused by sufficiently known hydraulic cylinders that are not illustrated in the figures. The discharge gate 14 includes opposite side walls 80, several deflection rollers 82 and a closed, endless tension means 84. The side walls 80 respectively extend in the same planes as do the side walls 22 of the frame 12 and close the baling chamber 42 on its end faces. Conventional, not-shown reinforcing elements extend between the side walls 80.

The four deflection rollers 82 used in this embodiment are mounted in fixed locations, but accommodated in the side walls 80 in a rotatable fashion, with the deflection rollers extending over the entire width of the baling chamber 42 parallel to the deflection rollers 36. The deflection rollers 82 consist of an upper front deflection roller, an upper rear deflection roller, a lower rear deflection roller and a lower front deflection roller. The lower front deflection roller 82 lies in the immediate vicinity of the rear lower roller 64 of the bottom conveyor 30. A deflection roller 82 that is carried by the arms 68 and situated in the immediate vicinity of the corresponding deflection roller 36 arranged on the arms 68 is provided between the lower front deflection roller and the upper front deflection roller 82. The vertically movable deflection roller 82 subjects the section of the tension means 84 which extends between the upper front deflection roller and the lower front deflection roller 82 to a forward excursion in the direction of the inlet 58.

The tension means 84 is constructed analogous to the tension means 40 in the frame 12 and extends over all aforementioned deflection rollers 82 in the discharge gate 14. The section of the tension means 84 which extends between the movable deflection roller and the lower front deflection roller 82 forms a length-adjustable part of the wall of the baling chamber 42.

According to the previous description, the round baler 10 according to FIGS. 1 and 2 functions as described below.

In a not-shown situation in which the arm 68 is situated in its lowest position due to the effect of the energy storing device 72, the carrier 32 approximately assumes the position shown in FIG. 1 and the sections of the tension means 40 between the upper roller 34 arranged on the carrier 32, the movable deflection roller 36 or the movable deflection roller 82, respectively, and the lower front deflection roller 82 essentially lies in a plane that extends from the front toward the rear at an incline of approximately 45°. In this case, the baling chamber 42 assumes a triangular shape, the hypotenuse of which is formed by the two aforementioned sections, with the triangle almost standing on one of its tips. The baling chamber 42 has the smallest possible volume in this instance.

At the beginning of the baling process, the round baler 10 is moved over a field on which the harvest is, for example, arranged in swaths, with the harvest being collected by means of the pick-up 24 and fed to the cutting mechanism 28. The rotor 52 conveys the harvest into the baling chamber 42 in an overshot fashion and, if applicable, past the knives 54. In the baling chamber, the harvest comes in contact with the sections of the tension means 40 and 84 which revolve in the same direction. Due to the cooperation between the rotatable support and, if applicable, the drive of the rollers 64 and the rollers 34 and the packing surface of the tension means 40 and 84, the harvest begins to rotate once it reaches a sufficient volume, namely in the counterclockwise direction in the figures. In another embodiment, the round bale 44 may also be wound up in the clockwise direction.

As the baling process progresses, the round baler 10 reaches the operating state shown in FIG. 1, namely the operating state in which the arm 68 is slightly moved upward against the force of the energy storing device 72. This causes the sections to be subjected to an upward excursion such that they are displaced out of the common plane and assume the shape of an obtuse roof. The carrier 32 is slightly pivoted in the counterclockwise direction about the pivoting axis 66 such that its lower roller 34 moves into the baling chamber 42. In this position, the round bale 44 is supported on the front roller 64 of the bottom conveyor and on the strippers 56.

As the baling process progresses, the round bale 44 reaches a size shown in FIG. 2. In this operating state, the arm 68 is completely pivoted upward and the energy storing device 73 is completely tensioned such that the highest density possible is achieved on the circumferential surface of the round bale 44. Since the bottom conveyor 30 is unable to yield, the round bale 44 is built up toward the top such that its circumferential surface presses against the upper roller 34 and pivots the carrier 32 about the pivoting axis 66 in the counterclockwise direction. Since the pivoting axis 66 is situated between the ends of the carrier 32, this pivoting movement causes the lower end region of the carrier 32 to move into the baling chamber 42 with the lower roller 34 such that the round bale 44 is displaced toward the rear and now only supported on the bottom conveyor 30 and the lower front deflection roller 82 in the discharge gate 14. Since the round bale 44 no longer slides directed past the inlet 58, the process of feeding additional harvest into the baling chamber 42 is simplified. Since three rollers 34 press against the circumferential surface of the round bale 44 in the region of the carrier 32, superior guidance of the round bale 44 and high compaction are achieved.

Figure 3:
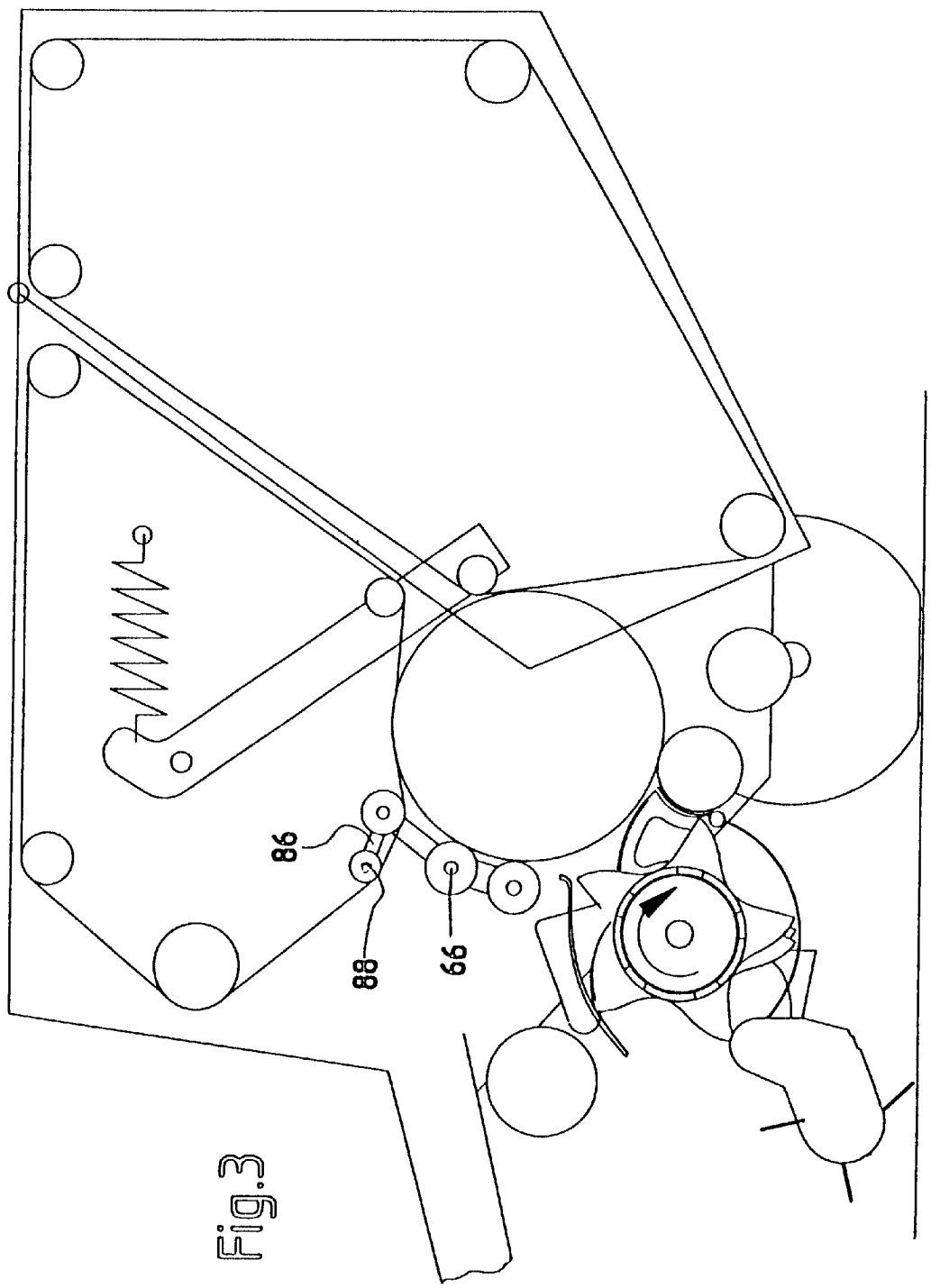
FIG. 3 is a schematic, left side view of a large round baler having a baling chamber, formed in accordance with a second embodiment of the invention, and shown in a condition at the beginning of the baling process.
Figure 4:
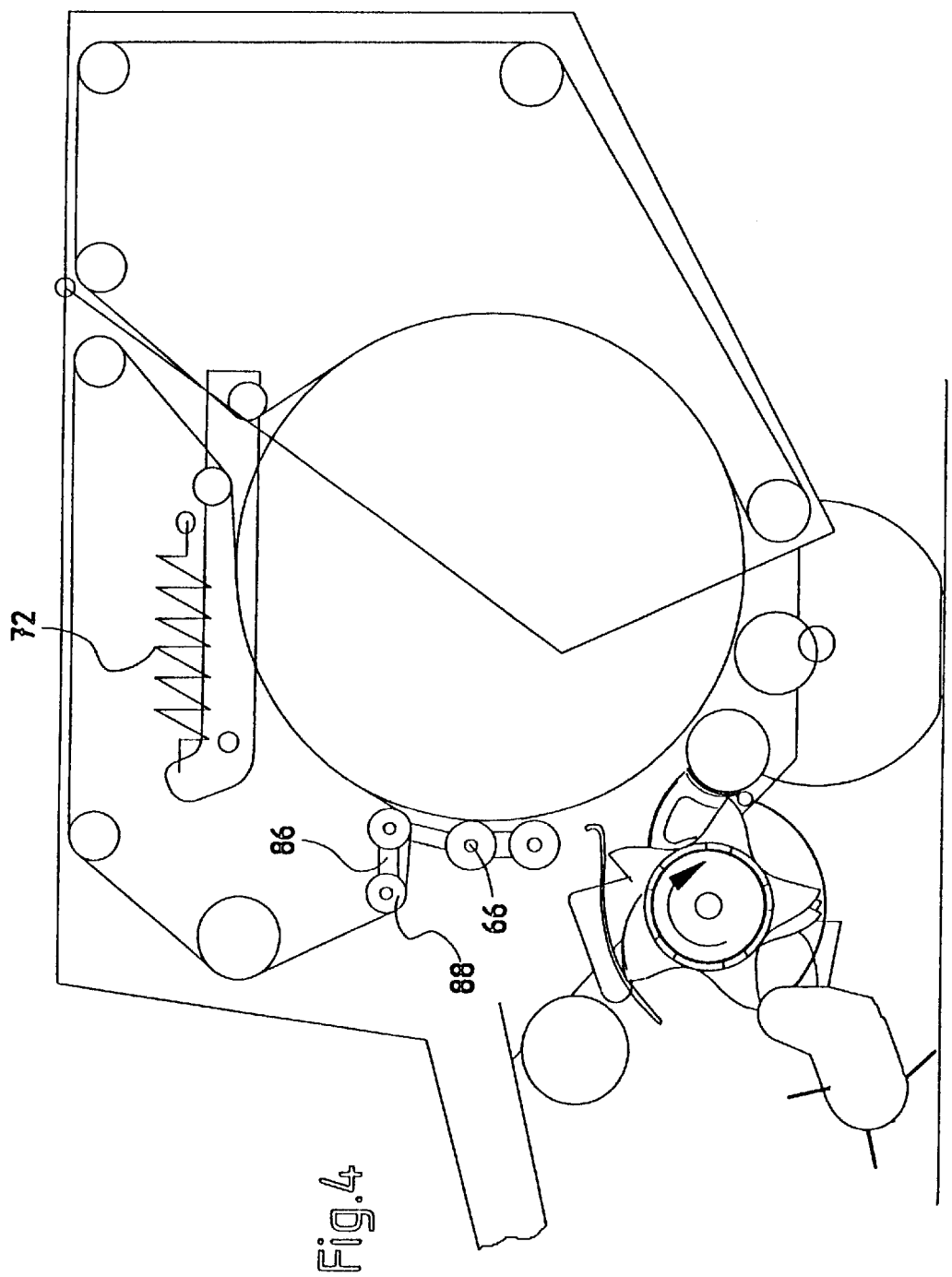
FIG. 4 is a view like that of FIG. 3 but showing the baling chamber in a condition at the end of the baling process.

FIGS. 3 and 4 show an embodiment of the invention which largely corresponds to the embodiment according to FIGS. 1 and 2 and also fulfills the same function. However, the carrier 32 in this embodiment according to FIGS. 3 and 4 contains an arm 86 with one additional roller 88.

The arm 86 essentially protrudes from the carrier 32 perpendicularly, namely in the direction toward the lower front deflection roller 36 in the frame 12. The arm 86 is rigidly connected to the carrier 32 in the region of the upper roller 34. The alignment is chosen such that the roller 88 carried by the arm 86 always adjoins the inner side of the tension means 40. The length of the arm 86 is chosen such that a lever arm is formed which, when pivoting the carrier 32 in the counterclockwise direction, subjects the section between the movable deflection roller and the lower front deflection roller 36 in the frame 12 to a noticeable additional excursion. Due to the excursion of this section, the tension in the tension means 40 is additionally increased at the end of the baling or winding process.

Having described the preferred embodiment, it will become apparent that various modifications can be made without departing from the scope of the invention as defined in the accompanying claims.

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

What is claimed is

1. In a large round baler including a baling chamber defined in part by at least one endless tension means and by a plurality of rollers, wherein at least three of said plurality of rollers are mounted to a carrier positioned at a front location of said baling chamber adjacent an inlet of the baling chamber, said carrier being mounted for pivoting about a horizontal, transverse axis, and, with respect to said inlet, said tension means being engaged with at least a remote first one of said at least three of said plurality of rollers, the improvement comprising: said tension means, carrier and remote first one of said at least three of said plurality of rollers being so arranged relative to each other and to said inlet that forces exerted on said tension means during formation of a bale will cause the carrier to be pivoted about said axis such as to urge at least a second one of said at least three of said plurality of rollers directly against said bale in a direction causing the bale to be positioned so as leave a gap between said bale and said inlet, thus creating a space aiding in feeding of harvest into the baling chamber.

2. The large round baler, as defined in claim 1, wherein said carrier projects upwardly from said inlet; and said at least remote first one of said at least three of said plurality of rollers being an uppermost one of said at least three of said plurality of rollers.

3. The large round baler, as defined in claim 1, wherein said carrier projects upwardly from said inlet; said at least three of said plurality of rollers being spaced along said carrier such that an intermediate one of said at least three of said plurality of rollers is coincident with said axis.

4. The large round baler, as defined in claim 1, wherein said at least second one of said plurality of rollers is larger in diameter than said at least remote first one of said at least three of said plurality of rollers.

5. The large round baler, as defined in claim 4, wherein said at least three of said plurality of rollers includes only one roller which is engaged by said tension means and two rollers which are located for direct engagement with said bale, with said two rollers being equal in diameter and larger in diameter than said only one roller.

6. The large round baler, as defined in claim 1, wherein said carrier is a two-armed structure, with a first arm extending upwardly from said inlet; said plurality of rollers including three rollers mounted to said first arm, with an upper one of said three rollers being mounted at an upper location of said first arm; said carrier including a second arm projecting forwardly from said upper location of said first arm and having a fourth roller mounted to a forward end location thereof; and said tension means being engaged with said upper one and fourth rollers, such that, as said carrier pivots about said axis, said tension means is tensioned by movement of said second arm and fourth roller.

7. The large round baler, as defined in claim 1, wherein said at least three rollers of said plurality of rollers are located along an arc having a center spaced rearward of said carrier and which is approximately coaxial with a formed bale of a maximum diameter that can be produced by said baler.

8. The large round baler, as defined in claim 1, wherein a harvest feed rotor is provided upstream of said inlet of said baling chamber and traces a path that protrudes within said inlet.

9. The large round baler, as defined in claim 8, where said rotor operates in an overshot fashion.

10. The large round baler, as defined in claim 9, wherein said rotor includes a plurality of transversely spaced flat blades; and further including a knife arrangement which includes a plurality of transversely spaced knives located above and projecting towards said rotor for cooperating with said flat blades for reducing said harvest to smaller pieces before entering said inlet.

* * * * *